United States Patent [19]
Hasegawa et al.

[11] 4,239,729
[45] Dec. 16, 1980

[54] OXYGENATOR

[75] Inventors: Hiroshi Hasegawa, Chofu; Hiromichi Fukasawa, Fuchu, both of Japan

[73] Assignee: Terumo Corporation, Tokyo, Japan

[21] Appl. No.: 44,518

[22] Filed: Jun. 1, 1979

[30] Foreign Application Priority Data

Jun. 6, 1978 [JP] Japan .................................. 53-68064
Mar. 28, 1979 [JP] Japan ............................ 54-40380[U]

[51] Int. Cl.³ .............................................. A61M 1/03
[52] U.S. Cl. ................................ 422/48; 128/DIG. 3
[58] Field of Search .................. 128/DIG. 3; 422/45, 422/48; 210/321 B

[56] References Cited

U.S. PATENT DOCUMENTS

| 3,579,810 | 5/1971 | Mon | 422/45 X |
|---|---|---|---|
| 3,673,612 | 7/1972 | Merrill et al. | 422/48 X |
| 3,794,468 | 2/1974 | Leonard | 422/48 |
| 3,855,475 | 12/1974 | Marx | 422/48 X |
| 3,893,926 | 7/1975 | Awad | 422/48 X |
| 3,934,982 | 1/1976 | Arjo | 422/48 |
| 4,055,696 | 10/1977 | Kamada et al. | 428/398 |
| 4,170,559 | 10/1979 | Kroplinski et al. | 422/48 X |

FOREIGN PATENT DOCUMENTS

| 1568130 | 5/1969 | France | 422/48 |
|---|---|---|---|
| 577037 | 10/1977 | U.S.S.R. | 422/48 |

OTHER PUBLICATIONS

Dutton et al., "Formation of Platelet Aggregate . . . Membrane Oxygenator", J. Biomed. Mater. Res., vol. 8, 1974, pp. 163-183.
Dutton et al., "Development & Evaluation of a New Hollow Fiber Membrane Oxygenator", Trans. Amer. Soc. Artif. Int. Organ., 1971, pp. 331-336.
Karlson et al., "Total Cardiopulmonary Bypass . . . Membrane Oxygenator", Surgery, 12/74, vol. 76, No. 6, pp. 935-945, National Institute of Health, Report NIH-69-2047.

Primary Examiner—Barry S. Richman
Attorney, Agent, or Firm—Frishauf, Holtz, Goodman & Woodward

[57] ABSTRACT

An oxygenator comprises a cylindrical housing provided with inlet and outlet ports for oxygen, and a bundle of hollow fibers disposed within the housing. The porous hollow fibers are made of polyolefin resin, sized at 100 to 300$\mu$ in inner diameter and 10 to 50$\mu$ in wall thickness, and have an average pore size of 200 to 1,000Å and porosity of 20 to 80%. The blood is allowed to flow through the hollow fibers and $O_2$—$CO_2$ exchange is effected through the porous walls of the hollow fibers.

13 Claims, 5 Drawing Figures 4,239,729

OXYGENATOR

BACKGROUND OF THE INVENTION

This invention relates to an oxygenator such as an artificial lung utilizing porous hollow fibers.

In conducting open heart surgery for medical treatment of heart disease or of large blood vessels, it is customary to use an oxygenator. Oxygenators include a bubble type, a membrane type, etc. It is expected that a membrane type, which is smallest in damage done to the blood, will provide the majority of oxygenators in future. In an oxygenator of this type, a sheet of silicone rubber membrane is generally employed as a gas exchange membrane and the blood is passed along one surface of the silicone rubber membrane, with a stream of oxygen gas passed along the other surface of the membrane. In this case, oxygen in the stream of oxygen gas and $CO_2$ in the blood are diffused across the membrane by the driving force created by the differences in partial pressure of oxygen and $CO_2$ between both sides of the membrane, resulting in exchange of oxygen gas for $CO_2$.

The conventional oxygenator outlined above is defective in that the silicone rubber membrane should be reasonably thick in view of the required mechanical strength thereof, leading to an inefficient $CO_2$ removal from the blood. If the oxygen ventilation rate is increased in an attempt to improve the $CO_2$ removal efficiency, the blood is caused to contain an excessive amount of oxygen. In other words, the respiratory quotient is caused to fall outside the physiological range.

It is also known in the art to use as the gas exchange membrane a microporous membrane made of a hydrophobic material in place of a silicone rubber membrane. In the conventional oxygenator, however, such a membrane is used in a plate or coil form, rendering it necessary to dispose a spacer between two adjacent membranes for preventing mutual blocking of the membranes and for keeping constant the passageways of the blood and gas. What should be noted is that the platelet is deposited on the spacer, resulting in failure of the treated blood to sufficiently recover its hemostatic ability. Further, thrombi are formed in the treated blood. Still further the spacer tends to cause damage to the membrane, causes pin hole occurrence and makes the artificial lung bulky.

It has also been proposed to use as a gas exchange membrane hollow fibers which permit smooth flow of blood and serve to eliminate a foreign matter in the blood passageway. Further, hollow fibers can be bundled, rendering it possible to assemble the device easily and to make the device smaller in size. It is one of the greatest requirements raised by the user to reduce the size of an oxygenator because a bulky device is difficult to handle. Still further, using a hollow fiber oxygenator facilitates removing air bubbles a in priming operation compared with using a plate or coil oxygenator. It is also important to note that the blood should flow through an oxygenator at a high rate, so that, the membrane housed in the device should be strong enough to withstand the pressure exerted by the blood. Needless to say, a hollow fiber is stronger than a flat membrane. An additional merit to be noted is that the device using hollow fibers is much simpler in structure than that using a flat or tubing membranes, resulting in that hollow fiber type devices are more uniform in quality. In spite of these merits, an aritifical lung utilizing hollow fibers has not yet been put to practical use because of the difficulties in selecting a suitable material for the hollow fiber and construction of the device permitting an improved $O_2$—$CO_2$ exchange efficiency.

An object of this invention is to provide a hollow fiber type oxygenator having an improved gas exchange efficiency, and which is small in size, easy to handle and stronger than those using a flat membrane.

SUMMARY OF THE INVENTION

According to this invention, there is provided a hollow fiber type oxygenator, comprising;
a cylindrical housing,
a bundle of porous hollow fibers made of polyolefin resin arranged within the housing in the axial direction thereof, each fiber having an inner diameter of 100 to 300$\mu$, a wall thickness of 10 to 50$\mu$, an average pore size of 200 to 1,000 Å and a porosity of 20 to 80%,
an oxygen chamber formed between the outer surface of the fiber bundle and the inner surface of the housing,
inlet and outlet ports for passing oxygen, each formed through the wall of the housing so as to communicate with the oxygen chamber,
partition walls supporting the end portions of the hollow fibers, separating the open ends of the hollow fibers from the oxygen chamber, and defining the length of the oxygen chamber, and
inlet and outlet ports for passing blood, each communicating with the interior space of each of the hollow fibers.

BRIEF DESCRIPTION OF THE DRAWINGS

This invention can be more fully understood from the following detailed description when taken in conjunction with the accompanying drawings, in which.

DETAILED DESCRIPTION

Figure 1:
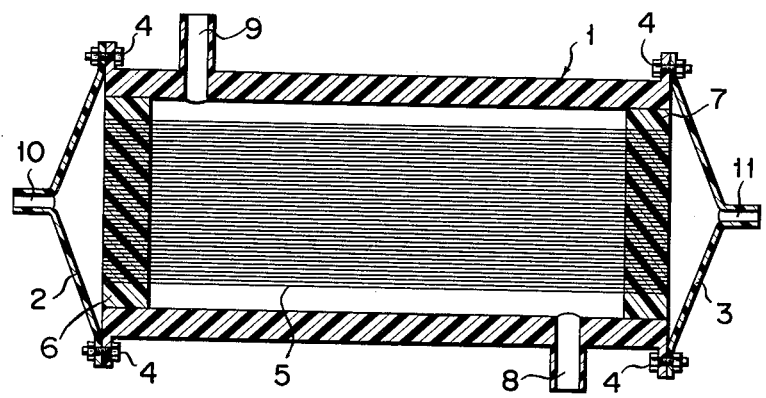
FIG. 1 is a schematic sectional view of the oxygenator according to one embodiment of this invention.

The oxygenator shown in FIG. 1 comprises a cylindrical housing 1 and funnel-shaped caps 2 and 3 mounted to the ends of the housing by means of screws 4. Arranged within the housing 1 in the axial direction thereof is a bundle of, for example, 10,000 to 60,000 porous hollow fibers 5 made of polyolefin resin. Both end portions of the hollow fiber bundle are supported by partition walls 6 and 7 fixed to the end portions of the housing 1. The, these partition walls are formed to fill the clearances among the outer surfaces of the hollow fibers. It follows that an oxygen chamber defined by the inner surfaces of the partition walls, outer surface of the hollow fiber bundle and inner surface of the housing is completely isolated from the interior spaces of the hollow fibers and from the outer spaces defined by the outer surfaces of the partition walls and the inner surfaces of the caps 2 and 3, respectively. As shown in FIG. 1, an oxygen inlet port 8 and an oxygen outlet port 9 each communicating with the oxygen chamber mentioned above are bored through the wall of the housing 1 near the ends of the housing 1. On the other hand, the caps 2 and 3 are provided with a blood inlet port 10 and a blood outlet port 11, respectively. Naturally, these inlet and outlet ports 10 and 11 communicate with the outer spaces mentioned above.

The porous hollow fiber 5 is made of polyolefin resin such a polyethylene, polypropylene, polybutylene, polystyrene, polyvinylchloride, acrylonitrile-butadiene-styrene terpolymer, styrene-acrylonitrile copolymer, styrene-butadiene copolymer, poly(4-metyl-pentene-1), polyvinylidene chloride and chlorinated polyethylene. It is necessary for the hollow fiber to have an inner diameter of about 100 to 300μ, a wall thickness of about 10 to 50μ, an average pore size of about 200 to 1,000 Å and a porosity of about 20 to 80%. Where a sheet-like silicone rubber membrane is used as in the conventional oxygenator, the gas exchange function is based mainly on the diffusion of the gas through the membrane. In the present invention, however, gases flow through the open cells of the porous membrane of polyolefin resin. Naturally, the gases are transferred smoothly through the wall of the hollow fiber, leading to a prominent improvement in the gas exchange capability of the hollow fiber.

In this invention, the inner diameter of the hollow fiber through which flows the blood is specified to range between 100μ and 300μ as mentioned above. If the inner diameter is smaller than 100μ, a large resistance is generated when the blood flows through the hollow fiber. In addition, the hollow fiber tends to be plugged. The upper limit of the inner diameter mentioned above has been determined by experiments described below.

Figure 2:
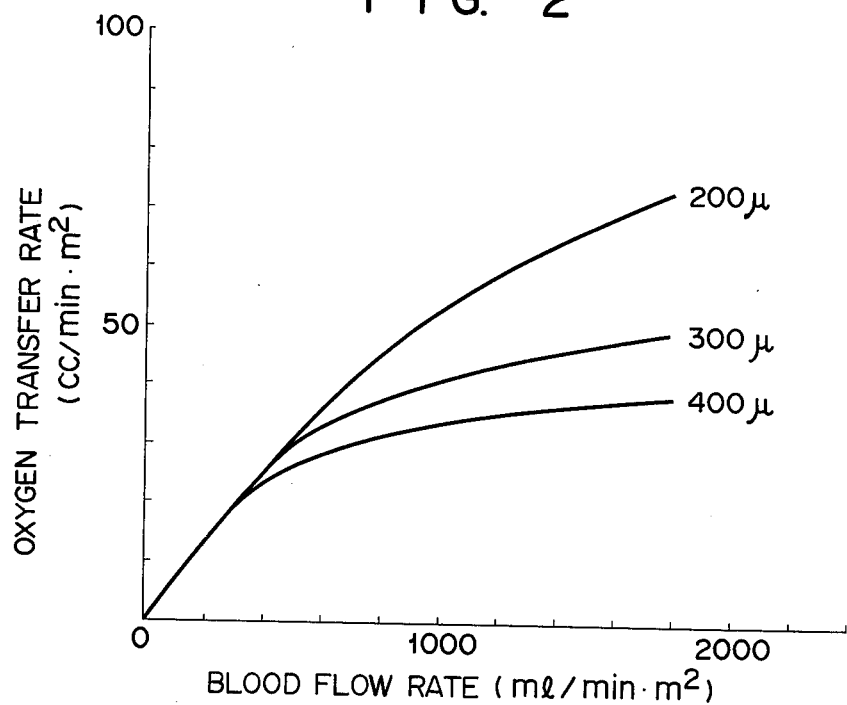
FIGS. 2 and 3 are graphs each showing the relationship between the inner diameter of the hollow fiber and the gas exchange capability.
Figure 3:
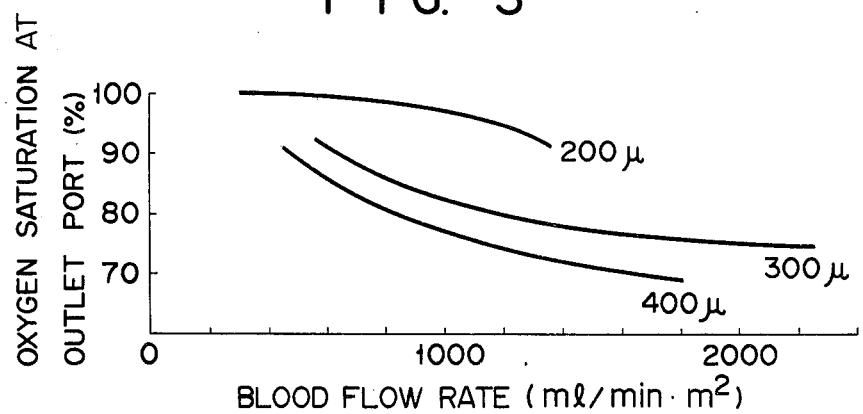

Specifically, the experiments were intended to look into the relationship between the blood flow rate and the oxygen transfer rate and between the blood flow rate and the oxygen saturation degree at the outlet port of the oxygenator. Used in the experiment were three kinds of oxygenators comprising a bundle of porous hollow fibers, about 30μ in wall thickness, made of polypropylene resin having a porosity of about 45 to 50% and an average pore size of about 500 to 650 Å. The oxygenators used were different from each other in inner diameter of the hollow fiber, i.e., the inner diameters were about 200μ, about 300μ and about 400μ, respectively. FIGS. 2 and 3 show the results of the experiments. The oxygen saturation degree of the blood was about 60% at the inlet of the oxygenator as is the case with the actual operation of an oxygenator.

FIG. 2, showing the relationship between the blood flow rate and the oxygen transfer rate, clearly shows that the hollow fiber having an inner diameter of about 200μ was most effective for performing oxygen transfer to the blood. It is also seen that the larger the inner diameter, the lower the oxygen transfer rate. The dimension of the blood flow rate shown in FIG. 2, i.e., ml/min.m$^2$, denotes the amount of the blood flowing through the hollow fiber every minute for a square meter of the effective surface area of the hollow fiber. The dimension of the oxygen transfer rate shown in FIG. 2 is thought obvious.

FIG. 3 shows that a smaller inner diameter of the hollow fiber leads to a higher oxygen saturation at the outlet of the oxygenator. In general, about 4 l/min of blood is treated in an oxygenator. Further, it is required that the difference in oxygen saturation be about 35% between the inlet and outlet of the oxygenator. Table 1 shows the surface area of the hollow fiber, priming volume and contact time of blood within the hollow fiber required for treating 4 l/min of blood in a manner to increase the oxygen saturation by 35% at the outlet of the oxygenator. Naturally the data shown in Table 1 was obtained from the data plotted in FIG. 3.

TABLE 1

| Inner Diameter of Hollow Fiber (μ) | Contact Time (sec) | Surface Area (m$^2$) | Priming Volume (cc) |
|---|---|---|---|
| 200 | 2.9 | 3.9 | 193 |
| 300 | 7.5 | 6.2 | 467 |
| 400 | 13.5 | 9.0 | 900 |

Table 1 shows that the hollow fiber having an inner diameter of about 400μ necessitates marked increases in required contact time, priming volume and surface area of the hollow fiber. The requirement of an increased hollow fiber surface area leads to an enlargement of the device and an increased manufacturing cost of the hollow fiber. In addition, water evaporation from the blood and deposition of the blood component to the fiber come out as problems to be solved. On the other hand, the increase in the amount of blood for priming results in side reactions of blood transfusions such as occurrences of blood-types incompatibility and infection of serum hepatitis.

It is preferred for the inner diameter of the hollow fiber to range between about 100μ and about 300μ.

The other properties of the hollow fiber of polyolefin resin specified in this invention have been determined in view of the gas permeability through the wall of the hollow fiber, mechanical strength of the fiber, etc. As described later, the partition walls 6 and 7 shown in FIG. 1 are formed by subjecting a potting material introduced into the housing 1 to centrifugal operation. If the wall of the hollow fiber is thinner than 10μ or the porosity of the hollow membrane is higher than 80%, the hollow fiber is caused to bear an undesirably large number of pin holes by the centrifugal operation of the potting material. However, it is unnecessary in terms of mechanical strength to use a hollow fiber having a wall thickness of more than 50μ. In addition, such a thick hollow fiber brings about enlargement of the fiber bundle and, thus, of the oxygenator itself as well as inefficient CO$_2$ removal from the blood. A hollow fiber having a porosity of less than 20% is also undesirable because the hollow fiber fails to perform a satisfactory gas exchange function.

The hollow fibers of of porous membrane of polyolefin resin used in this invention can be prepared in accordance with the method described in for example, U.S. Pat. No. 4,055,696 or German Patent Disclosure (DE-OS) No. P.2737745. The method disclosed in the German specification mentioned above permits producing hollow fibers of resins other than polyolefin series resins. But, polyolefin series resins have hydrophobic surfaces and, thus, are superior to other resins in compatibility with blood. In addition, polyolefin series resins are preferred in terms of the manufacturing cost of the hollow fiber.

In this invention, it is preferred to coat the inner surface and open end faces of the hollow fiber with a thrombus-preventing material. As indicated in NIH (National Institute of Health) report-NIH-69-2047, a hollow fiber type artificial lung is defective in that the hollow fiber tends to be plugged by thrombus formation. According to the research carried out by the present inventors, it is important to apply said coating to, particularly the end faces of the hollow fiber bundle because blood coagulation tends to occur most prominently at the end faces mentioned. The coating applied to the blood-contact portions of the hollow fiber mentioned above serves to prevent thrombus formation and plugging of the hollow fiber. As a matter of fact, a prominent effect of the coating has been confirmed experimentally. Specifically, blood was passed through an oxygenator comprising hollow fibers whose end faces had not been coated with a thrombus-preventing material and through an artificial lung comprising hollow fibers having their end faces coated with a thrombus-preventing material, i.e., heparin-based material. About 15 to 30 minutes after the beginning of the operation, more than 50% of the non-coated fibers were found to have been plugged in contrast to less than 5% for the coated fibers. This experiment substantiates that the thrombus formation at the end faces of the hollow fibers is the greatest cause of the fiber plugging and that the difficulty can be overcome by coating the end faces with a thrombus-preventing material. Of course, it is possible to apply the coating to the entire surfaces of the hollow fiber. A heparin-based material, e.g., benzalkonium-heparin, cethylpyridinium bromide-heparin is suitable for use as a thrombus-preventing material. Other substances such as polyalkyl sulfone, ethylcellulose and polydimethylsiloxane also provide satisfactory coating materials because these substances are comparable with the heparin-based material in thrombus-preventing effect and, in addition, exhibit a high gas permeability. When a coating is applied on the gas exchange surface of the hollow fibers, the coating layer may be about 1 to $20\mu$ thick. Certainly, the pores of the porous hollow fiber are covered with the coating layer, but the gas permeability through the wall of the hollow fiber is not influenced too much because the coating layer has a high gas permeability. On the contrary, the coating layer covering the pores of the hollow fiber serves to prevent water evaporation from the blood. Further, it may happen accidentally that the oxygen pressure outside the hollow fiber is rendered higher than the blood pressure inside the hollow fiber, though the blood pressure mentioned is kept higher than the oxygen pressure in the normal operation of an oxygenator. In this case, oxygen flows into the blood, thereby causing bubbling of the blood. However, the coating applied to the hollow fiber serves to prevent this bubbling problem. Needless to say, the coating is also effective for preventing the blood from being clotted.

It is described in "J. BIOMED. MATER RES VOl. 8, 1974" that albumin is added to a priming solution so as to rinse the oxygenator. But, this method is not so effective as the coating of a thrombus-preventing material. In addition, it is necessary for the user of the oxygenator to conduct troublesome operations in practicing the method disclosed in the above-noted literature.

The partition walls 6 and 7 shown in FIG. 1 are formed by employing a centrifugal operation as mentioned previously. In general, a high molecular potting material having a high polarity such as polyurethane, silicone or epoxy resin is poured into the housing 1 through the oxygen inlet and outlet ports 8 and 9. In this step, the housing 1 is kept rotated about the center thereof so as to centrifugally throw the potting material to the ends of the housing 1. More specifically, a bundle of a number of hollow fibers longer than the housing 1 and having the open ends sealed with a highly viscous resin is arranged first within the housing 1. Then, a lid, not shown, having an inner diamer substantially equal to the outer diameter of the housing 1 is applied to each end of the hollow fiber bundle so as to cover completely the end portion of the bundle. Under this condition a high molecular potting material is poured into the housing through the oxygen inlet and outlet ports 8 and 9. In this step, the housing 1 is kept rotated about the center thereof. It follows that the potting material is centrifugally displaced at the end portions of the housing 1 so as to form potting material layers substantially uniform in thickness. After the potting material has been solidified, the lid is removed and the end portion of the fiber bundle is cut away by a sharp cutter so as to expose the interior spaces of the hollow fibers to the outside.

Figure 4:
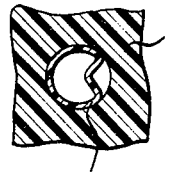
FIG. 4 is a cross sectional view showing how the hollow fiber embedded in a potting material peels from the potting material.

The partition wall formed by the process described above, however, might not be satisfactory because the polyolefin hollow fiber used in this invention is low in polarity and, thus, very poorly adhesive to the potting material. In particular, the hollow fiber peels from the potting material as shown in FIG. 4 when the end portion of the fiber bundle is cut off after solidification of the potting material. If the clearance made by the peeling of the hollow fiber extends through the partition wall, the partition wall fails to perform its proper function. Even if the clearance mentioned does not extend through the partition wall, the blood flow is disturbed and stagnated by the clearance, resulting in the thrombus formation.

In order to overcome the difficulties mentioned above, it is preferred to oxidize the outer surface of the hollow fiber at the end portions which are to be embedded in the partition wall so as to introduce carbonyl groups, i.e., polar radicals, into the polyolefin fiber. The oxidation can be achieved by chemical treatment, flame treatment or electric discharge treatment. For the chemical treatment, it is possible to use a mixture of chromic acid with hydrochloric acid or sulfuric acid. For the electric discharge treatment, it is possible to employ plasma discharge, corona discharge, etc.

It has been recognized that, where the outer surface of the hollow fiber is treated by, for example, corona discharge of 1 KW, the percentage of peeled hollow fiber is as low as less than 5% in contrast to more than 95% for the case of applying no oxidation treatment. In other words, the oxidation treatment permits bonding the hollow fiber and the potting material substantially completely.

Figure 5:
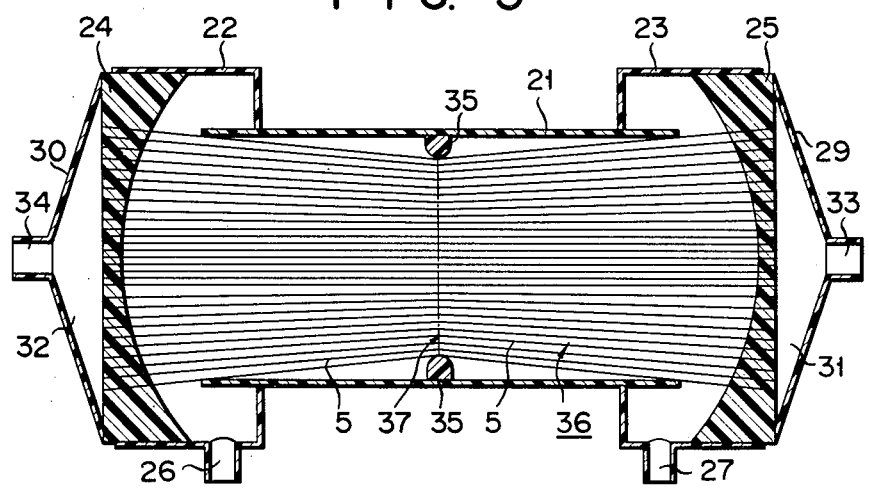
FIG. 5 is a schematic sectional view of the oxygenator according to another embodiment of this invention.

FIG. 5 shows the oxygenator according to another embodiment of this invention. It is seen that the housing of the oxygenator consists of a central cylinder 21 and outer cylinders 22, 23 larger in diameter than the central cylinder 21. As in the embodiment of FIG. 1, a bundle 36 of, for example, 10,000 to 60,000 hollow fibers 5 is disposed within the housing. The hollow fiber bundle 36 is supported at the end portions by partition walls 24 and 25 formed at the outer end portions of the outer cylinders 22 and 23, respectively. Further, funnel-shaped head covers 29 and 30 are fixed to the outer faces of the partition walls 25 and 24 respectively, so as to form a blood inlet chamber 31 and a blood outlet chamber 32. Reference numerals 33 and 34 denote a blood inlet port and a blood outlet port, respectively. Still further, the outer cylinders 22 and 23 are provided with an oxygen inlet port 26 and an oxygen outlet port 27, respectively. Ports 26 and 27 communicate with the oxygen chamber formed within the housing. Further, the partition walls 24 and 25 perfectly isolate the oxygen chamber from the blood inlet and outlet chambers 31 and 32 and from the interior spaces of the hollow fibers 5.

It is important to note that the central cylinder 21 is provided at the center with an inward projection 35. The inward projection 35, which is integral with the central cylinder 21, serves to fasten the hollow fiber bundle 36 disposed within the housing. It follows that the loading density of the hollow fibers 5 varies along the axial direction of the housing. Naturally, the density mentioned is highest at a fastened portion 37, with said density gradually lowered toward the end portions of the hollow fibers. It is desirable to set the loading density at about 50 to 80% at the fastened portion 37, at about 30 to 60% at the ends of the central cylinder 21 with a condition that the loading density at the central portion 37 is at least 1.1 times larger than those at the ends of the central cylinder 21, and at about 20 to 40% at the outer faces of the partition walls 24 and 25. Incidentally, the term "loading density" used herein represents the percentage of the space occupied by the hollow fibers relative to the interior space of the housing in a section perpendicular to the axis of the housing and is defined as follows:

$$D = (AN/B) \times 100 (\%)$$

where,
D—loading density
B—cross sectional area defined by the inner surface of the housing
A—cross sectional area defined by the outer surface of one hollow fiber
N—the number of hollow fibers As is apparent from the drawing, the blood introduced through the blood inlet port 33 into the blood inlet chamber 31 flows through the interior spaces of the hollow fibers 5 to the blood outlet chamber 32 and is discharged through the blood outlet port 34. On the other hand, oxygen introduced into the oxygen chamber through the oxygen inlet port 26 flows through the clearances among the outer surfaces of the hollow fibers 5 toward the oxygen outlet port 27. It follows that oxygen is transferred into the blood through the porous wall of the hollow fiber, with carbon dioxide contained in the blood being transferred into the oxygen stream through said porous wall. It should be noted that channeling does not occur in the blood stream because the blood flows through a large number of very small hollow fibers. But, channeling tends to occur in the oxygen stream depending on the fashion of the hollow fiber distribution, leading to an unsatisfactory gas exchange performance of the oxygenator. In the oxygenator of the invention, the gas transfer through the wall of the hollow fiber depends on the difference in partial pressure of the gas between the blood stream and the oxygen stream. The partial pressure difference should be about 680 mm Hg for oxygen and about 46 mm Hg for carbon dioxide for enabling the artificial lung to perform a satisfactory operation. In order to provide the required partial pressure difference for carbon dioxide, it is necessary for the outer surface of the hollow fiber to be kept in contact with fresh oxygen all the time. It follows that channeling to the oxygen stream gives remarkable detrimental effects to, particularly, carbon dioxide removal from the blood stream.

However, the oxygenator shown in FIG. 5 permits an effective $O_2$-$CO_2$ exchange. Specifically, the hollow fiber bundle 36 is fastened in the center by the inward projection 35 (and is loose at both end portions) in the embodiment of FIG. 5, permitting the hollow fibers 5 to be distributed uniformly within the housing. As a result, the oxygen gas is uniformly distributed within the housing and forms a stable flow, leading to an improved $O_2$-$CO_2$ exchange efficiency. It should also be noted that the oxygen flows more rapidly at the fastened portion 37 of the fiber bundle, resulting in turbulence of the oxygen flow and, thus, in promotion of the gas transfer through the wall of the hollow fiber.

As described previously, it is desirable to set the hollow fiber loading density at about 50 to 80% at the fastened portion 37. If the loading density is lower than 50%, it is difficult to have the hollow fiber bundle 36 fastened uniformly by the inward projection 35. In this case, the hollow fibers 5 are not distributed uniformly at the fastened portion 37, giving rise to the occurrence of channeling or a dead space in the oxygen stream and, thus, to unsatisfactory performance of $CO_2$ removal. If the loading density is higher than 80%, the hollow fibers in contact with the inward projection 35 are pressed so hard as to be collapsed, resulting in the restriction of blood passage, a decrease in efficiency and blocking of the passage. In addition, it is difficult to insert the hollow fiber bundle 36 into the housing.

As mentioned previously, it is desirable to set the hollow fiber loading density at about 30 to 60% at the ends of the central cylinder 21 with a condition that the loading density at the central portion 37 is at least 1.1 times larger than those at the ends of the central cylinder 21. If the loading density is lower than 30%, it is difficult to achieve a uniform distribution of the hollow fibers 5, leading to an inefficient gas exchange performance of the device. The inefficient performance is also caused where the loading density is higher than 60%. In this case, some hollow fibers are closely attached to each other, leading to the occurrence of in the oxygen stream and, thus, to inefficient performance of the device.

If the ratio of the loading density at the central portion 37 to that at the ends of the central cylinder 21 is smaller than 1.1, the effect of the squeezing or rapid turbulence of the oxygen gas stream may not be sufficient enough.

The loading density of the hollow fibers at the outer faces of the partition walls 24 and 25 should be about 20 to 40% as described previously. If the loading density is lower than 20%, it is difficult to achieve a uniform distribution of the hollow fibers 5, resulting in that the blood stream fails to be distributed uniformly. In this case, thrombi tends to be caused at the outer faces of the partition walls. If the loading density is higher than 40%, some hollow fibers are closely attached to each other, resulting in that the potting material fails to enter the small clearances among the closely attached hollow fibers in the step of forming the partition walls 24 and 25. Naturally the failure for the potting material to enter said clearances causes leakage of fluid through the partition wall.

In the embodiment of FIG. 5, the inward projection 35 is formed integral with the central cylinder 21. Alternatively, it is possible to mount a separately formed annular member within the central cylinder 21 so as to provide the inward projection 35. Further, the inward projection 35 may be omitted by allowing the inner diameter of the central cylinder 21 to taper from the ends toward the center such that the inner diameter of the central cylinder 21 is made smallest at the center.

As described in detail, the oxygenator shown in FIG. 5 is featured in that the bundle of a large number of hollow fibers is fastened by the inward projection 35 provided in the center of the central cylinder 21. The fastening permits distributing the hollow fibers uniformly within the housing even if they are relatively nonuniformly distributed at the end portions of the housing. It follows that the use of the inward projection facilitates the manufacture of an artificial lung, i.e., a high manufacturing precision is not required. In a addition, the oxygen gas is uniformly distributed within the housing and forms a stable stream, leading to an efficient $O_2$–$CO_2$ exchange performance of the device. Further, turbulence of the oxygen gas stream is caused by the presence of the inward projection 35, resulting in promotion of the $O_2$–$CO_2$ exchange performance of the device.

An experiment was conducted by using an oxygenator as shown in FIG. 5, with the result that the RQ (respiratory quotient, i.e., the ratio of $CO_2$ transfer rate to $O_2$ transfer rate) of the device was 0.8 to 1.5. The oxygenator used in the experiment comprised the central cylinder 3.5 cm in inner diameter and 20 cm in length, the outer cylinders 22, 23 each sized at 5 cm in inner diameter, and a bundle of about 9,000 polypropylene hollow fibers, 5 each sized at 200$\mu$ in inner diameter and at a 25$\mu$ in wall thickness. The polypropylene mentioned has an average pore size of 600Å and a porosity of 45%. Further, the distance between the partition walls 24 and 25 was 17 cm. Still further, the loading density of the hollow fibers 5 was 50 to 80% at the fastened portion 37, 45% at the ends of the central cylinder 21, and 22% at the outer faces of the partition walls 24 and 25. In this experiment, the oxygen transfer rate was about 50 cc/min. A comparative test was conducted under the same condition by using an oxygenator which does not comprise the inward projection 35, with the result that the value of RQ was 0.4 to 1.1. The oxygen transfer rate was found to be about 50 cc/min in this experiment, too. In conclusion, the inward projection scarcely affects the $O_2$ transfer rate, but prominently enhances the $CO_2$ transfer rate. In addition, the variation in $CO_2$ transfer rate is markedly narrowed by the presence of the inward projection. Since physiological RQ is 0.8, an artificial lung should desirably exhibit an RQ higher than 0.8. This substantiates that the inward projection 35 permits prominently enhancing the performance of the artificial lung.

As described in detail, this invention has made it possible to put hollow fibers to practical use as the gas exchange medium of an artificial lung. Naturally, the hollow fiber is higher in mechanical strength then the flat membrane used in the conventional artificial lung. In addition, the use of hollow fibers permits making the device markedly smaller than the conventional device.

What we claim is:

1. An oxygenator, comprising:
   an elongated hollow housing having a longitudinally extending axis;
   a bundle of porous hollow fibers made of polyolefin resin arranged within the housing in the axial direction thereof, each fiber having an inner diameter of 100 to 300$\mu$, a wall thickness of 10 to 50$\mu$, an average pore size of 200 to 1,000Å and a porosity of 20 to 80%;
   an oxygen chamber formed between the outer surface of the fiber bundle and the inner surface of the housing;
   inlet and outlet oxygen ports extending through the wall of the housing so as to communicate with the oxygen chamber;
   partition walls supporting the end portions of the hollow fibers, separating the open ends of the hollow fibers from the oxygen chamber and defining the length of the oxygen chamber; and
   inlet and outlet blood ports communicating with the interior space of each of the hollow fibers;
   the hollow fibers having polar radicals introduced into at least the outer surfaces of the polyolefin resin of the hollow fiber at the portions supported by the partition walls.

2. The oxygenator according to claim 1 wherein said elongated hollow housing is an elongated round-cylindrical housing.

3. The oxygenator according to claim 1, wherein the polyolefin resin is selected from the group consisting of polyethylene and polypropylene.

4. The oxygenator according to claim 1 or 3, wherein the housing is provided with a radially inwardly directed projection serving to fasten a central portion, in the lengthwise direction, of the hollow fiber bundle.

5. The oxygenator according to claim 4, wherein the loading density of the hollow fiber is 50 to 80% at the fastened portion, 30 to 60% at the outer faces of the partition walls and the loading density at the central portion of the housing is at least 1.1 times larger than those at the ends of the housing.

6. The oxygenator according to claim 1 or 3, wherein the hollow fibers have open ends, the inner surfaces and open ends of the hollow fibers being coated with a thrombus-preventing material.

7. The oxygenator according to claim 6, wherein the housing is provided with a radially inwardly directed projection serving to fasten a central portion of the hollow fiber bundle.

8. The oxygenator according to claim 7, wherein the loading density of the hollow fiber is 50 to 80% at the fastened portion, 30 to 60% at the outer faces of the partition walls and the loading density at the central portion of the housing is at least 1.1 times larger than those at the ends of the housing.

9. An oxygenator, comprising:
   an elongated hollow housing having a longitudinally extending axis;
   a bundle of porous hollow fibers made of polyolefin resin arranged within the housing in the axial direction thereof, each fiber having an inner diameter of 100 to 300$\mu$, a wall thickness of 10 to 50$\mu$, an average pore size of 200 to 1,000Å and a porosity of 20 to 80%;
   an oxygen chamber formed between the outer surface of the fiber bundle and the inner surface of the housing;
   inlet and outlet oxygen ports extending through the wall of the housing so as to communicate with the oxygen chamber;
   partition walls supporting the end portions of the hollow fibers, separating the open ends of the hollow fibers from the oxygen chamber and defining the length of the oxygen chamber;
   inlet and outlet blood ports communicating with the interior space of each of the hollow fibers; and a radially inwardly directed projection provided on an inner wall of the housing for fastening a central portion, in the lengthwise direction, of the hollow fiber bundle relative to the housing.

10. The oxygenator according to claim 9 wherein said elongated hollow housing is an elongated round-cylindrical housing.

11. The oxygenator according to claim 9, wherein the loading density of the hollow fiber is 50 to 80% at the fastened portion, 30 to 60% at the outer faces of the partition walls and the loading density at the central portion of the housing is at least 1.1 times larger than those at the ends of the housing.

12. The oxygenator according to claim 9, wherein the polyolefin resin is selected from the group consisting of polyethylene and polypropylene.

13. The oxygenator according to claim 9 or 12, wherein the hollow fibers have open ends, the inner surfaces and open ends of the hollow fibers being coated with a thrombus-preventing material.

* * * * *